United States Patent
Menke

(10) Patent No.: US 6,814,478 B2
(45) Date of Patent: Nov. 9, 2004

(54) CONDUCTIVE SPRING CURRENT FOR WARNING LIGHT

(75) Inventor: W. Kenneth Menke, Glendale, MO (US)

(73) Assignee: The Fire Products Company, Webster Groves, MO (US)

(*) Notice: Subject to any disclaimer, the term of this patent is extended or adjusted under 35 U.S.C. 154(b) by 0 days.

(21) Appl. No.: 10/374,227

(22) Filed: Feb. 25, 2003

(65) Prior Publication Data
US 2004/0165399 A1 Aug. 26, 2004

(51) Int. Cl.[7] ................................................. B60Q 1/56
(52) U.S. Cl. ...................... 362/499; 362/272; 362/284; 362/324; 362/542; 340/472; 439/540
(58) Field of Search ................................. 362/271, 272, 362/281, 282, 283, 284, 323, 324, 499, 542; 340/471, 472; 439/840

(56) References Cited

U.S. PATENT DOCUMENTS

| | | | |
|---|---|---|---|
| 2,512,167 A | 6/1950 | Mirandi | |
| 2,841,922 A | 7/1958 | Kolintzas | |
| 3,863,999 A | * 2/1975 | Muller | 439/36 |
| 4,511,880 A | * 4/1985 | Stanuch | 340/472 |
| 4,633,375 A | * 12/1986 | Tres | 362/542 |
| 5,540,593 A | 7/1996 | Takahashi | |
| 5,676,447 A | 10/1997 | Menke | |
| 5,876,108 A | 3/1999 | Chien | |
| 5,912,445 A | 6/1999 | Takedomi | |
| 5,934,223 A | * 8/1999 | Ellery-Guy | 119/702 |
| 5,990,697 A | 11/1999 | Kazama | |
| 6,043,666 A | 3/2000 | Kazama | |
| 6,086,432 A | 7/2000 | Frinker et al. | |
| 6,174,172 B1 | 1/2001 | Kazama | |
| 6,283,603 B1 | 9/2001 | Lin | |
| 6,416,330 B1 | 7/2002 | Yatskov et al. | |
| 6,592,423 B1 | * 7/2003 | Boyle et al. | 446/175 |

* cited by examiner

Primary Examiner—John Anthony Ward
(74) Attorney, Agent, or Firm—Thompson Coburn LLP

(57) ABSTRACT

An electric current path for an oscillating warning light of an emergency vehicle includes a spring that is connected between a stationary base of the warning light and an oscillating assembly of the warning light.

18 Claims, 2 Drawing Sheets

CONDUCTIVE SPRING CURRENT FOR WARNING LIGHT

BACKGROUND OF THE INVENTION (1) Field of the Invention

The present invention pertains to a conductive spring current path for a warning light. More specifically, the present invention pertains to an electric current path for a warning light typically employed on emergency vehicles where the warning light is oscillated through an arc segment. The conductive circuit that provides power to the warning light includes a spring that is connected between a stationary base of the warning light and an oscillating assembly of the warning light.

(2) Description of the Related Art

A standard prior art emergency vehicle warning light comprised a sealed beam lamp in which a light bulb and a reflector were integrally assembled. The warning light would be mounted to the emergency vehicle by a bearing assembly that enabled the sealed beam lamp to rotate. A motive source would be provided to rotate the sealed beam lamp. The electric current that provided power to the lamp would typically employ a conductive slip ring and a carbon brush that would slide along the slip ring as the lamp is rotated. The return current path from the lamp would typically pass through the bearing assembly.

These prior art emergency vehicle warning lights were disadvantaged in that they required large currents to illuminate the lamps. In addition, the carbon brushes that would slide along the conductive slip rings of the lamps would wear over time and require frequent replacement. The carbon brushes sliding on the conductive slip rings would also produce a dirty, abrasive dust that could interfere with the operations of the warning lights. The high currents returned through the bearing assemblies of the lights also degraded the bearing lubricant as the result of electrical arcing that would occur in the bearing assembly.

The subsequent development of the halogen light capsule led to the development of modern emergency vehicle warning lights in which a parabolic reflector is rotated around or oscillated adjacent a hardwired, stationary lamp to create a flashing signal. More recently, emergency vehicle warning light assemblies have been developed in which the light source is permanently or semi-permanently attached to the reflector. These warning light assemblies had the advantages of being small, higher performance assemblies that could be manufactured, and in some cases, permanently focused by computer-controlled robotic assemblers.

Still newer emergency vehicle warning light sources, for example LED's with integral lens optics or reflectors, provide further improvements to emergency vehicle warning lights, including oscillating warning lights. However, a persistent problem in the design of oscillating warning lights is providing a reliable, maintenance-free circuit path that supplies electric energy to the moving light source. Oscillating lights generally operate at a rate of 100 cycles per minute. This rate of oscillation has required a more complex circuit path to supply electric power to the oscillating light assembly which increases its manufacturing costs.

SUMMARY OF THE INVENTION

The oscillating emergency vehicle warning light of the present invention is basically comprised of a light assembly that is mounted on a stationary base by a pivot mount. The pivot mount enables the light assembly to rotate or pivot about an axis of the pivot mount relative to the base. A motive source is operatively connected to the pivot mount and oscillates the pivot mount and the attached light assembly through an arc segment.

The stationary base can be a part of the emergency vehicle with which the warning light is used, or can be a separate component part attached to the emergency vehicle.

The pivot mount is comprised of a bearing assembly that has a hollow shaft at its center. The hollow shaft is mounted stationary to the base and a bearing sleeve is mounted for rotation on the exterior of the hollow shaft. (Note: The bearing could be stationary with the hollow shaft attached to the oscillating element.)

The light assembly is mounted to the bearing sleeve of the bearing assembly. The light assembly comprises a mounting bracket that is secured to the bearing sleeve for oscillating movement with the bearing sleeve. An optical source, including a light source and a lens optic or reflector, are mounted on the mounting bracket for oscillating movement with the mounting bracket.

The motive source is connected through a drivewheel with the bearing sleeve. The motive source oscillates the drivewheel and thereby oscillates the bearing sleeve and the attached mounting bracket of the light assembly.

The electrical circuit of the invention provides a resilient electrical connection to the oscillating light assembly that is capable of withstanding the many oscillating cycles of the light assembly during the useful life of the warning light. The circuit comprises a power wire that is operatively connected to a source of electric power. The power wire is secured to the stationary base. A ground wire, also operatively connected to the source of electric power, is also secured to the stationary base. The novel features of the electrical circuit connect the stationary power wire through the oscillating light assembly to the stationary ground wire to complete the circuit through the light assembly.

In a first embodiment of the novel electrical circuit, the circuit includes a spiral spring having a length with opposite first and second ends and a center axis. The length of the spring is positioned in a single plane and spirals around the axis of the spring. The axis of the spring extends through the hollow shaft of the pivot mount. One end of the spiral spring is operatively connected to the stationary power wire and the opposite end of the spiral spring is operatively connected to a portion of the electrical circuit that oscillates with the light assembly. The return path of the electrical circuit from the light assembly passes through the bearing assembly to the ground wire connected to the stationary base.

A second embodiment of the electrical circuit employs a coil spring having a length with opposite first and second ends and a center axis. The length of the coil spring coils around the spring axis. The coil spring extends through the hollow shaft of the pivot mount. One end of the coil spring is operatively connected to the power wire secured stationary relative to the base and the opposite end of the coil spring is operatively connected to a portion of the electrical circuit that oscillates with the light assembly. The electrical circuit returns from the light assembly through the bearing assembly to the ground wire secured to the stationary base.

In both embodiments of the circuit, the spring provides a flexible leg in the circuit that can operate for many cycles of the light assembly without requiring maintenance.

BRIEF DESCRIPTION OF THE DRAWING FIGURES

Further features of the inventions are revealed in the following detailed description of the preferred embodiments of the invention and in the drawing figures wherein.

DETAILED DESCRIPTION OF THE PREFERRED EMBODIMENTS

Figure 1:
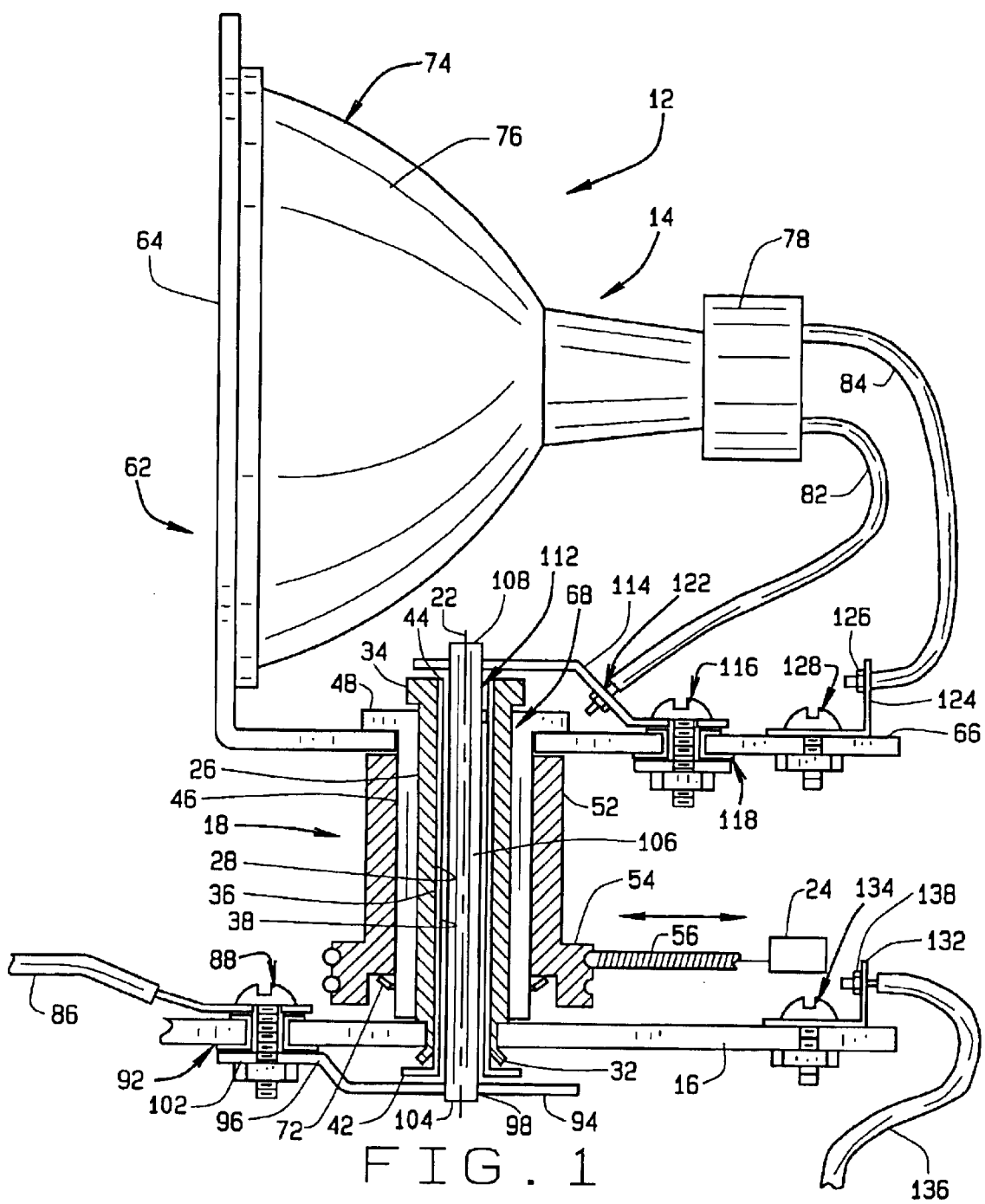
FIG. 1 is a partially cross-sectioned side view of a first embodiment of the conductive spring current path for a warning light of the present invention.

A first embodiment of the oscillating warning light with a conductive spring current path 12 is shown in FIG. 1 of the drawing figures. The warning light is basically comprised of a light assembly 14 that is mounted to a stationary base 16 by a pivot mount 18. The pivot mount 18 enables the light assembly 14 to rotate or pivot relative to the stationary base 16 about a common axis 22 of the light assembly and pivot mount. A separate motive source 24 is operatively connected to the pivot mount 18 and is selectively operated to oscillate the pivot mount 18 and the attached light assembly 14 through an arc segment. A variety of different motive sources may be employed as the motive source 24, for example the motive source disclosed in U.S. Pat. No. 5,676,447, which is assigned to the assignee of the present invention and is incorporated herein by reference.

Only a portion of the stationary base 16 is shown in FIG. 1. The stationary base 16 may be a portion of the emergency vehicle with which the warning light of the invention is used. Alternatively, the stationary base 16 can be a portion of a separate support structure that is attached to the emergency vehicle. In the embodiment of the warning light shown in FIG. 1, the stationary base 16 is constructed of metal to provide sufficient support for the warning light. In addition, with the stationary base 16 being constructed of an electrically conductive metal it also forms a portion of the electric circuit that provides power to the warning light, as will be explained.

The pivot mount 18 that attaches the light assembly 14 to the base 16 is comprised of a cylindrical shaft 26 at the center of the pivot mount. The shaft 26 has a hollow interior bore 28 that extends entirely through the shaft from a bottom end 32 of the shaft to a top end 34 of the shaft. The shaft bottom end 34 is secured stationary relative to the base 16 by being swagged to the base or by being secured to the base by other equivalent means. The shaft 26 is constructed of a conductive metal and the connection of the shaft bottom end 32 to the base 16 operatively connects the shaft 26 and base 16 together as part of the electric circuit of the invention which will be explained.

A tubular insulator assembly 36 extends through the shaft interior bore 28. The tubular insulator assembly 36 has a hollow interior bore 38 that extends entirely through the insulator assembly from a bottom end 42 of the assembly to a top end 44 of the assembly. A top flange on the tubular insulator, press fit or other means, is used to retain the tubular insulator inside the shaft interior bore.

A bearing sleeve 46 is mounted on the exterior of the pivot mount shaft 26 for rotational movement of the bearing sleeve 46 around the shaft. The bearing sleeve 46 is also constructed of a conductive metal and with the pivot mount shaft 26, forms a portion of the electrical circuit of the invention which will be explained. The bearing sleeve 46 is formed with an annular flange 48 that projects readily outwardly from the top end of the bearing sleeve.

A cylindrical collar 52 with an integral driven wheel 54 is press fit over the exterior of the bearing sleeve 46. The collar 52 and driven wheel 54 are mounted to the bearing sleeve 46 for oscillating movement with the bearing sleeve about the pivot mount shaft 26. The driven wheel 54 has a peripheral surface that is formed as a pulley. The peripheral surface of the driven wheel 54 engages with an oscillating drive belt 56 of the separate motive source 24.

The oscillating drive belt 56 of the separate motive source 24 imparts oscillating movement to the driven wheel 54 and cylindrical collar 52 as well as to the bearing sleeve 46. One example of an oscillating drive belt 56 is shown as a belt 424 in the earlier referenced U.S. Pat. No. 5,676,447. The drive belt 56 is only one example of a means for imparting oscillating movement to the collar 52, the driven wheel 54 and bearing sleeve 46, and other equivalent means of oscillating the driven wheel 54, the cylindrical collar 52 and the bearing sleeve 46 may be employed.

The light assembly 14 includes a mounting bracket 62 that is attached to the pivot mount 18 for oscillating movement with the pivot mount. The mounting bracket 62 is constructed of a conductive metal and also forms a part of the electric circuit to be explained. The bracket 62 is formed with a vertically oriented portion 64 and a horizontally oriented portion 66. The horizontally oriented portion 66 has a hole 68 that receives the bearing sleeve 46 in mounting the bracket 62 to the pivot mount 18. As seen in FIG. 1, the bracket horizontal portion 66 is clamped between the bearing sleeve annular flange 48 and the top of the cylindrical collar 52. A retainer ring 72 is mounted over the bottom of the bearing sleeve 46 and presses upwardly against the driven wheel 54 of the cylindrical collar 52. The retainer ring 72 securely clamps the bracket horizontal portion 66 between the bearing sleeve flange 48 and the cylindrical collar 52 of the driven wheel 54 so that the mounting bracket 62 moves in oscillating movements with the bearing sleeve 64 and the cylindrical collar 52 and driven wheel 54 about the pivot mount shaft 26.

The light assembly 14 also includes an optical source 74 comprised of a bulb or halogen capsule (not shown) permanently attached to a reflector 76. The optical source 74 is mounted to the vertically oriented portion 64 of the mounting bracket for oscillating movement of the optical source 74 with the mounting bracket 62. A power connector 78 of the optical source includes a power wire 82 to the optical source and a ground wire 84 to the optical source.

An electric power supply wire 86 that communicates with a separate source of power (not shown) provides electric power to the electric circuit of the warning light. The supply of electric power through the power wire 86 can be selectively controlled by a separate system of controls (not shown). The power wire 86 is operatively connected and held stationary relative to the base 16 by a nut and bolt fastener assembly 88. The nut and bolt fastener assembly 88 is electrically conductive, but is insulated from the conductive stationary base 16 by an insulating assembly 92 comprising a tubular shoulder bushing and a washer. The insulating assembly 92 insulates both the power wire 86 and the nut and bolt fastener assembly 88 from electrical contact with the stationary base 16.

Figure 2:
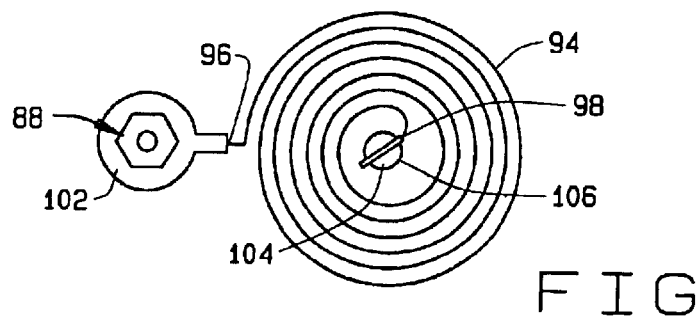
FIG. 2 is a plan view of the spiral spring of FIG. 1.

A first embodiment of the conductive spring 94 of the electric circuit of the invention is shown in FIGS. 1 and 2. The conductive spring 94 is a spiral spring that has a length between opposite first 96 and second 98 ends of the spring. The length of the spiral spring is positioned in a single plane and spirals around an axis of the spring that is coaxial with the pivot mount axis 22. The first end 96 of the spiral spring 94 is connected to a conductive washer 102 at the outer periphery of the spring. The washer 102 is mounted stationary to the stationary base 16 by the nut and bolt fastener assembly 88, thereby securing the spring first end 96 stationary relative to the base 16. The conductive washer 102 is insulated from the base 16 by the shoulder bushing and washer insulating assembly 92. The second end of the spring 98 at the center of the spring is mechanically and electrically connected to the bottom end 104 of an electrically conductive rod 106. The connection between the spring 94 and the rod 106 can be provided by soldering or by other equivalent means.

The conductive rod 106 extends from its bottom end 104 upwardly through the interior bore 28 of the pivot mount shaft 26. The rod 106 extends through the tubular insulator bore 38 contained in the pivot mount shaft interior bore 28, to the top end 108 of the rod that projects outwardly from the tubular insulator assembly 36. The conductive rod 106 is dimensioned so that there is an air gap 112 between the exterior surface of the rod 106 and the interior surface of the tubular insulator assembly 36. This allows the rod 106 to pivot freely within the interior bore 38 of the tubular insulator assembly 36.

The top end 108 of the conductive rod 106 is mechanically and electrically connected to an electrically conductive power strip 114. As seen in FIG. 1, the flared upper end 44 of the tubular insulator assembly 36 extends between the power strip 114 and the top end 34 of the pivot mount shaft 26 insulating the power strip 114 from the pivot mount shaft 26. The power strip 114 extends outwardly away from the conductive rod 106 to an end of the power strip that is operatively connected to the horizontal portion 66 of the mounting bracket 62 by a nut and bolt fastener 116. This connects the power strip 114 and the conductive rod 106 to the mounting bracket 62 for oscillating movement with the mounting bracket. The oscillating movement is transmitted through the conductive rod 106 to the second end 98 of the spiral spring 94 connected to the conductive rod. The resiliency of the spiral spring 94 allows the spring second end 98 to move in the pivoting movement with the conductive rod 106 while the spring first end 96 remains stationary relative to the base 16. Thus, the spring 94 provides a resilient electrical connection between the power wire 86 secured stationary relative to the base 16 of the light and the light assembly 14 that oscillates relative to the base. The end of the power strip 114 and the nut and bolt fastener assembly 116 are insulated from the mounting bracket 62 by an insulating assembly comprised of a shoulder bushing and a washer 118. The power strip 114 is electrically connected to the optical source power wire 82 by a soldered connection 122 or other equivalent electrically conductive connection between the power strip 114 and the wire 82. This connection provides electrical power provided to the power wire 86 through the spring 94, the conductive rod 106, the power strip 114 and the optical source power wire 82 to the power connection 78 of the optical source 74.

The optical source ground wire 84 is connected to an electrically conductive ground strip 124 by a soldered connection 126 or other equivalent electrically conductive connection. The ground strip 124 is electrically connected to the mounting bracket 62 by an electrically conductive nut and bolt fastener assembly 128. This electrically conductive connection provided by the nut and bolt assembly 128 connects the optical source ground wire 84 through the mounting bracket 62, the bearing sleeve 46 and the pivot mount shaft 26 in electrical communication with the stationary base 16.

An electrically conductive base ground strip 132 is operatively connected to the base 16 by an electrically conductive nut and bolt fastener assembly 134. The base ground strip 132 is electrically connected to the ground wire 136 of the separate electrical power source (not shown) by a soldered connection 138 or other equivalent electrical connection. This completes the electrical circuit connection between the separate power source (not shown) to the light assembly 14 employing the resilient conductive spring 94 of the invention. The electrical connection of the spring first end 96 to the power wire 86 held stationary relative to the base 16, and the electrical connection of the spring second end 98 to the conductive rod 106 and the power strip 114 that oscillate with the light assembly 14 provides a reliable, maintenance free circuit path that supplies electric energy to the moving light assembly 14 from a stationary power source.

Figure 3:
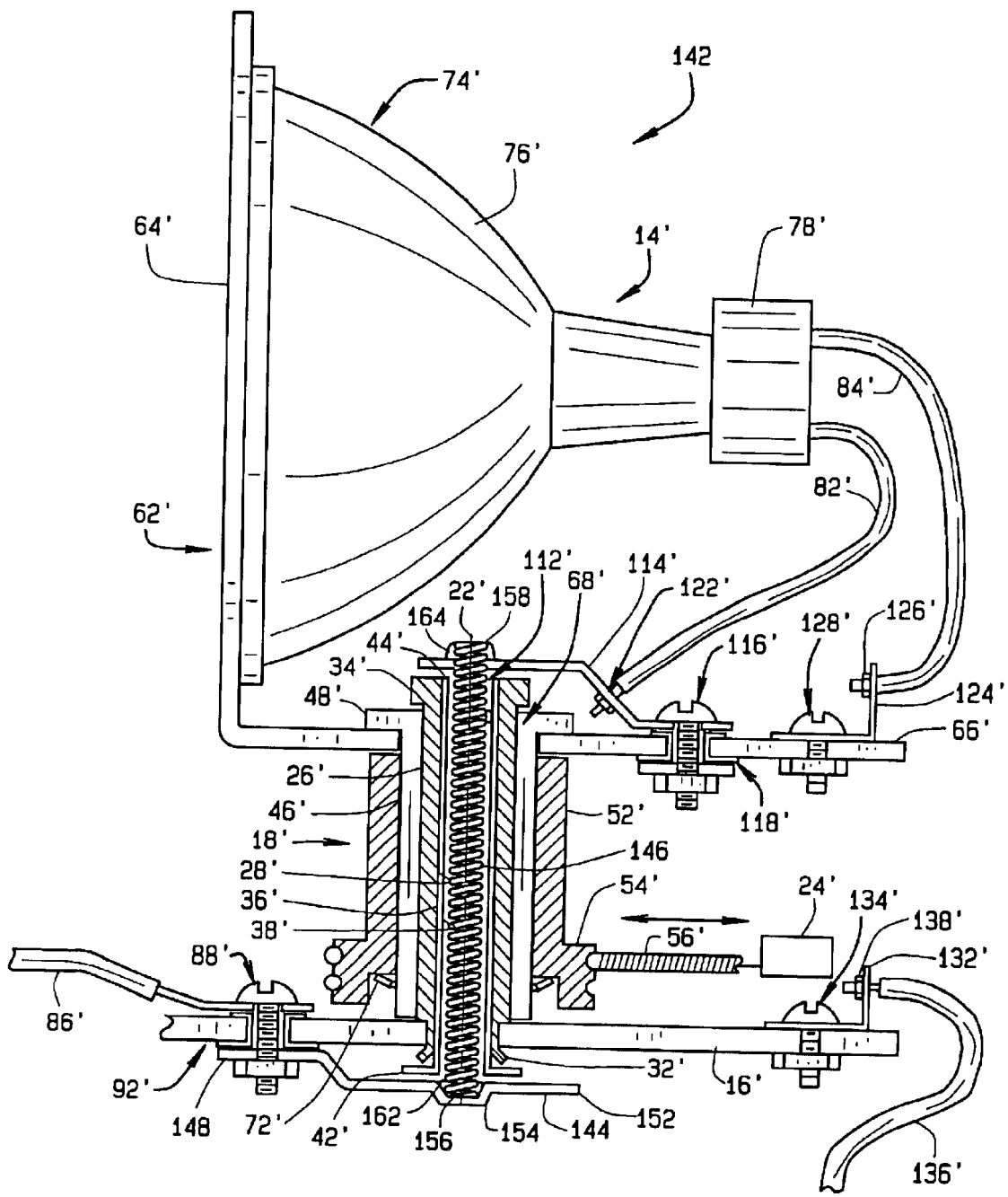
FIG. 3 is a partially cross-sectioned side view of a second embodiment of the conductive spring current path for a warning light of the present invention.

FIG. 3 shows a second embodiment of the warning light with a conductive spring current path 142 of the invention. Many of the component parts of the second embodiment shown in FIG. 3 are the same as those shown in FIG. 1. These component parts are identified by the same reference numerals employed to identify the component parts in the description of the embodiment of FIG. 1, with the reference numerals being followed by a prime('). Because these same component parts of the second embodiment have already been described, only those component parts of the embodiment of the warning light conductive spring circuit of FIG. 3 that differ from the component parts of the embodiment of FIG. 1 will be described.

In the second embodiment the spiral spring 94 and conductive rod 106 of the first embodiment have been eliminated. In their place the electric circuit is provided with a base conductive power strip 144 and a coil spring 146 that are connected between the nut and bolt fastener assembly 88' that connects the power wire 86' to the base 16' and the power strip 114' of the light assembly.

A first end 148 of the base conductive power strip 144 is provided with a hole to receive the bolt of the nut and bolt fastener assembly 88' therethrough. This connection secures the conductive power strip 144 stationary to the base 16'. The insulator assembly 92' that surrounds the nut and bolt fastener assembly 88' also insulates the base conductive power strip 144 from the conductive base 16'. The length of the base conductive power strip 144 extends from the nut and bolt fastener assembly 88' to the second end 152 of the strip positioned beneath the pivot mount 18'. A locating detail such as a cup shaped indentation or through hole 154 is provided in the second end 152 of the base conductive power strip. The locating detail 154 is positioned directly beneath the interior bore 38' of the tubular insulator assembly 36' that extends through the pivot mount 18'.

As seen in FIG. 3, the coil spring 146 has a length between opposite first 156 and second 158 ends of the spring that extends through the interior bore 38' of the tubular insulator assembly 36'. The coil spring 146 coils around a center axis of the spring that is coaxial with the pivot axis 22' of the pivot mount 18'. The exterior of the coil spring 146 is dimensioned so that there is an air gap 112' between the coil spring exterior surface and the interior surface of the tubular insulator interior bore 38'. The air gap 112' enables free pivoting movement of the spring 146 about the axes 22' of the pivot mount 18' and the spring. The first end 156 of the coil spring is received in a locating detail 154 at the second end 152 of the base power strip. The coil spring first end 156 is mechanically and electrically connected to the base power strip indentation 154 by a soldered connection 162 or by another equivalent electrical connection. Preferably, two or more of the coil spring windings at the spring first end 156 are secured to the indentation 154 by the electrical connection. The coil spring second end 158 is mechanically and electrically connected to the electrically conductive power strip 114' of the light assembly 14'. In the preferred embodiment the connection between the coil spring second end 158 and the conductive power strip 114' is provided by a hole through the power strip through which the coil spring second end 158 extends and a soldered connection 164 between the coil spring second end 158 and the conductive power strip 114'. As with the coil spring first end 156, the soldered connection of the coil spring second end 158 to the conductive strip 114' solders two or more windings of the spring second end to the conductive strip.

The resiliency of the coil spring 146 allows the spring second end 158 to move in a pivoting movement with the light assembly 14' while the coil spring first end 156 remains stationary relative to the base 16'. Thus, the coil spring 146 provides a resilient, reliable maintenance free circuit path between the power wire 86' secured stationary relative to the base 16' of the light and the light assembly 14' that oscillates relative to the base.

While the invention has been described by reference to specific embodiments, it should be understood that modifications and variations of the invention may be constructed without departing from the scope of the invention defined in the following claims.

What is claimed is:

1. An oscillating light apparatus comprising:

a stationary base;

a light assembly mounted on the base for oscillating movements of the light assembly about an axis relative to the base;

a motive source operatively connected with the light assembly to selectively move the light assembly in oscillating movements about the axis relative to the base;

an electric circuit operatively connected with the light assembly to selectively supply electric power to the light assembly to illuminate the light assembly;

a spring that is part of the electric circuit; and, the spring having a length with opposite first and second ends, the spring first end being operatively connected to the base and being held stationary relative to the base and the spring second end being operatively connected to the light assembly and being held stationary relative to the light assembly whereby the spring second end will move in oscillating movements relative to the base with the light assembly.

2. The apparatus of claim 1, further comprising:

the spring having a least one winding formed in the spring between the spring first and second ends.

3. An oscillating light apparatus comprising:

a stationary base;

a light assembly mounted on the base for oscillating movements of the light assembly about an axis relative to the base;

a motive source operatively connected with the light assembly to selectively move the light assembly in oscillating movements about the axis relative to the base;

an electric circuit operatively connected with the light assembly to selectively supply electric power to the light assembly to illuminate the light assembly;

a spring that is part of the electric circuit;

the spring being a spiral spring; and, the spring having an axis that the spring spirals around and the spring axis being coaxial with the axis of the light assembly.

4. An oscillating light apparatus comprising:

a stationary base;

a light assembly mounted on the base for oscillating movements of the light assembly about an axis relative to the base;

a motive source operatively connected with the light assembly to selectively move the light assembly in oscillating movements about the axis relative to the base;

an electric circuit operatively connected with the light assembly to selectively supply electric power to the light assembly to illuminate the light assembly;

a spring that is part of the electric circuit;

the spring being a coil spring; and, the spring having an axis that the spring coils around and the spring axis being coaxial with the axis of the light assembly.

5. An oscillating light apparatus comprising:

a stationary base;

a light assembly mounted on the base for oscillating movements of the light assembly about an axis relative to the base;

a motive source operatively connected with the light assembly to selectively move the light assembly in oscillating movements about the axis relative to the base;

an electric circuit operatively connected with the light assembly to selectively supply electric power to the light assembly to illuminate the light assembly;

a spring that is part of the electric circuit;

a pivot mount mounting the light assembly to the base for the oscillating movements of the light assembly relative to the base, the pivot mount having a hollow interior bore extending through the pivot mount; and, the electric circuit extending through the hollow interior bore of the pivot mount.

6. The apparatus of claim 5, further comprising:

the pivot mount hollow interior bore having a bore axis that is coaxial with the axis of the light assembly; and, the spring being a spiral spring having a spring axis that the spring spirals around and the spring axis being coaxial with the bore axis and the axis of the light assembly.

7. The apparatus of claim 5, further comprising:

the spring being a spiral spring having a length with opposite first and second ends with the first end being at an outer periphery of the spiral spring and the second end being at a center of the spiral spring; and, a conductive rod connected to the spiral spring second end and extending through the pivot mount hollow interior bore, the conductive rod being part of the electric circuit.

8. The apparatus of claim 5, further comprising:

the spring being a coil spring that extends through the pivot mount hollow interior bore.

9. An oscillating light apparatus comprising:

a stationary base;

a light assembly operatively mounted on the base for oscillating movements of the light assembly relative to the base;

a spring having a length with opposite first and second ends, the spring first end being operatively connected to the base and being held stationary relative to the base and the spring second end being operatively connected to the light assembly and being held stationary relative to the light assembly whereby the spring second end will move in oscillating movements relative to the base with the light assembly; and, an electric circuit operatively connected to the spring first and second ends where the spring is a conductor in the electric circuit.

10. The apparatus of claim 9, further comprising:

the spring having at least one winding formed in the spring between the spring first and second ends.

11. The apparatus of claim 9, further comprising:

the spring being a spiral spring.

12. The apparatus of claim 9, further comprising:

the light assembly being mounted on the base for oscillating movements of the light assembly about a light assembly axis; and, the spring being a spiral spring that spirals around a spring axis and the spring axis being coaxial with the light assembly axis.

13. The apparatus of claim 9, further comprising:

the spring being a coil spring.

14. The apparatus of claim 9, further comprising:

the light assembly being mounted on the base for oscillating movements of the light assembly about a light assembly axis; and, the spring being a coil spring that coils around a spring axis and the spring axis being coaxial with the light assembly axis.

15. The apparatus of claim 9, further comprising:

a pivot mount mounting the light assembly to the base for oscillating movement of the pivot assembly about a pivot axis relative to the base, the pivot mount having a hollow interior bore and the pivot axis extending through the hollow interior bore; and, the electric circuit extending through the pivot mount hollow interior bore.

16. The apparatus of claim 15, further comprising:

the spring being a spiral spring having a spring axis that the spiral spring spirals around and the spring axis being coaxial with the pivot mount pivot axis.

17. The apparatus of claim 15, further comprising:

the spring being a spiral spring having a length with opposite first and second ends with the first end being at an outer periphery of the spring and the second end being at a center of the spring; and, a conductive rod connected to the spiral spring second end and extending through the pivot mount hollow interior bore, the conductive rod being part of the electrical circuit.

18. The apparatus of claim 15, further comprising:

the spring being a coil spring that extends through the pivot mount hollow interior bore.

* * * * *